US011946731B1

(12) United States Patent
Barnett

(10) Patent No.: US 11,946,731 B1
(45) Date of Patent: Apr. 2, 2024

(54) CLUSTER OF ARROW HEADS AND A METHOD OF MANUFACTURING THE SAME

(71) Applicant: David A. Barnett, Tarpon Springs, FL (US)

(72) Inventor: David A. Barnett, Tarpon Springs, FL (US)

(73) Assignee: BARNETT OUTDOORS, LLC, Tarpon Springs, FL (US)

( * ) Notice: Subject to any disclaimer, the term of this patent is extended or adjusted under 35 U.S.C. 154(b) by 0 days.

(21) Appl. No.: 18/244,935

(22) Filed: Sep. 12, 2023

Related U.S. Application Data

(60) Provisional application No. 63/407,880, filed on Sep. 19, 2022.

(51) Int. Cl.
| | | |
|---|---|---|
| *F42B 6/08* | (2006.01) | |
| *B29C 45/00* | (2006.01) | |
| *B28B 1/24* | (2006.01) | |

(52) U.S. Cl.
CPC ............ *F42B 6/08* (2013.01); *B29C 45/0081* (2013.01); *B28B 1/24* (2013.01)

(58) Field of Classification Search
CPC ....... F42B 6/08; B29C 45/00; B29C 45/0062; B29C 45/0081; B29C 2045/2683; B29C 2045/2691
See application file for complete search history.

(56) References Cited

U.S. PATENT DOCUMENTS

| | | | | |
|---|---|---|---|---|
| 3,756,601 A | * | 9/1973 | Frey, Jr. .................... | F42B 6/08 473/582 |
| 6,739,991 B1 | * | 5/2004 | Wardropper .............. | F42B 6/08 473/578 |
| 6,739,992 B2 | * | 5/2004 | Kummerle ................ | F42B 6/08 473/582 |
| 6,863,630 B1 | * | 3/2005 | Watkins .................... | F42B 6/08 473/583 |
| 9,638,499 B2 | | 5/2017 | Perry | |
| 10,018,452 B1 | * | 7/2018 | Ma ....................... | B29C 45/4407 |
| 10,859,354 B1 | | 12/2020 | Huang | |
| 11,098,994 B1 | | 8/2021 | Huang | |
| 2017/0067723 A1 | * | 3/2017 | Pedersen ............. | B29C 45/0013 |
| 2018/0128586 A1 | * | 5/2018 | Warner .................. | B65D 43/02 |
| 2022/0228844 A1 | * | 7/2022 | Haas ......................... | F42B 6/08 |

* cited by examiner

*Primary Examiner* — John A Ricci
(74) *Attorney, Agent, or Firm* — Donald J. Ersler

(57) ABSTRACT

An arrow head cluster is created utilizing an injection mold. An upper cluster cavity is formed in an upper die member and a lower cluster cavity is created in a lower die member. The upper and lower cluster cavities, when joined create a cluster cavity. The cluster cavity is used to create the arrow head cluster, after molten material is injected into the injection mold. The cluster cavity includes a plurality of chambers for creating a plurality of arrow heads. The plurality of chambers are connected to each other with a plurality of flow channels and a support frame. The injected material includes metals, ceramic and plastic. The materials are injected into the cluster cavity through the plurality of flow channels. The plurality of flow channels allow the material to flow evenly through the plurality of cluster cavities.

7 Claims, 8 Drawing Sheets

CLUSTER OF ARROW HEADS AND A METHOD OF MANUFACTURING THE SAME

CROSS-REFERENCES TO RELATED APPLICATIONS

This is a non-provisional patent application which claims the benefit of provisional patent application No. 63/407,880, filed on Sep. 19, 2022.

BACKGROUND OF THE INVENTION

1. Field of the Invention

The present invention relates generally to archery and more specifically to a cluster of arrow heads and a method of manufacturing the same. The arrow head may also include threads that are self-tapping.

2. Discussion of the Prior Art

Historically, arrow heads have been made through numerous methods from forging to machining to metal injection molding also known as MIM. These arrow heads have a shank at one end having external threads for securing to an arrow. Conventional broadheads are fabricated from steel, aluminum, or titanium ferrule and razor type blades joined with the ferrule. MIM broadheads must be sharpened. Once the broadheads have been finished, they are usually placed in packages holding three to four per package. The broadheads are independent from each other, and once the package is opened, the broadheads are loose and hard to handle.

Other types of arrow heads have similar negative characteristics. Judo points, small game heads, even field points are difficult to manufacture, package, and handle as individual pieces. Counting of the individual pieces and then packaging them is labor intensive. During the opening of the package, the arrow heads are often spilled.

Patent no. 9638499 to Perry discloses an insert/outsert assembly with arrow heads having internal threads as shown in FIGS. 5-6. Arrow heads having external threads are shown in FIG. 4. Patent no. 10,859,354 to Huang discloses an arrow insert with threaded stem for retaining an arrow tip. Patent no. 11,098,994 to Huang discloses an arrow insert with threaded stem for retaining an arrow tip for engagement with a broad head. Huang 10,859,354 and 11,098,994 provide for arrow heads having internal threads, however these products still retain the same difficulties in manufacturing, packing, and use. The manufacturing process for the above prior art is laborious and expensive.

Accordingly, there is a clearly felt need in the art for a cluster of arrow heads and a method of manufacturing the same, which provides a more cost-effective arrow head and includes a manufacturing process for the same.

SUMMARY OF THE INVENTION

Embodiments of the invention include numerous types of arrow heads, including but not limited to broadheads, small game heads, and field points. These embodiments may have internal threads for the engagement of an arrow, or external threads for the engagement of an arrow. The arrow heads are to be made in a cluster, a unique manufacturing and packaging solution, and the cluster will be used in a unique way as well. Alternate embodiments are arrow heads having external, self-tapping threads. The self-tapping threads interact with the bore of a molded arrow insert or molded arrow.

An injection molding tool is provided having a cavity designed to facilitate these unique features. The cavity has multiple chambers for multiple finished arrow heads, and the chambers are connected by flow channels and a support frame. The composite material includes metals, ceramic and plastic. High strength composite materials are forced into the mold cavity. The flow chambers allow the materials to flow evenly through all of the chambers and the support frame. The flow chambers are engineered to provide the correct flow of materials, in addition to being only large enough to support the individual arrow heads within the cluster until final use. The arrow head cluster is removed from the molding tool and allowed to cool. After cooling, the arrow head cluster is ready for packaging, saving all of the steps of counting, assembling, and sharpening.

Each arrow head is retained on the cluster frame with at least one break away connection. At the time of first use, the user would remove the cluster frame from the packaging. An arrow would be threadably joined with the arrow head. The arrow is rotated in a first direction to the point where the threads of the arrow and the arrow head are completely engaged. Once the threads are completely engaged, the user rotates the arrow the same direction just enough to break the arrow head away from the cluster frame.

An embodiment of the invention may include a broadhead having internal threads.

An embodiment of the invention may include a broadhead having external threads.

An embodiment of the invention may include a broadhead having external self-tapping threads.

An embodiment of the invention may include a small game head having internal threads.

An embodiment of the invention may include a small game head having external threads.

An embodiment of the invention may include a small game head having external self-tapping threads.

An embodiment of the invention may include a field point having internal threads.

An embodiment of the invention may include a field point having external threads.

An embodiment of the invention may include a field point having external self-tapping threads.

An embodiment of the invention may include a judo point having internal threads.

An embodiment of the invention may include a judo point having external threads.

An embodiment of the invention may include a judo point having external self-tapping threads.

Embodiments of the invention may include clusters having 2, 3, 4, 5, 6, 7, 8, 9, 10, 11, 12 or more arrow heads.

In yet another embodiment, the cluster may be molded with a protective, disposable hood. The hood is attachable to a bow or crossbow. Arrows would be threadably joined with the arrow heads still retained in the cluster. The arrows would be rotated in a first direction to the point where the threads of the arrow and the arrow head are completely engaged.

DETAILED DESCRIPTION OF THE PREFERRED EMBODIMENTS

Figure 1:
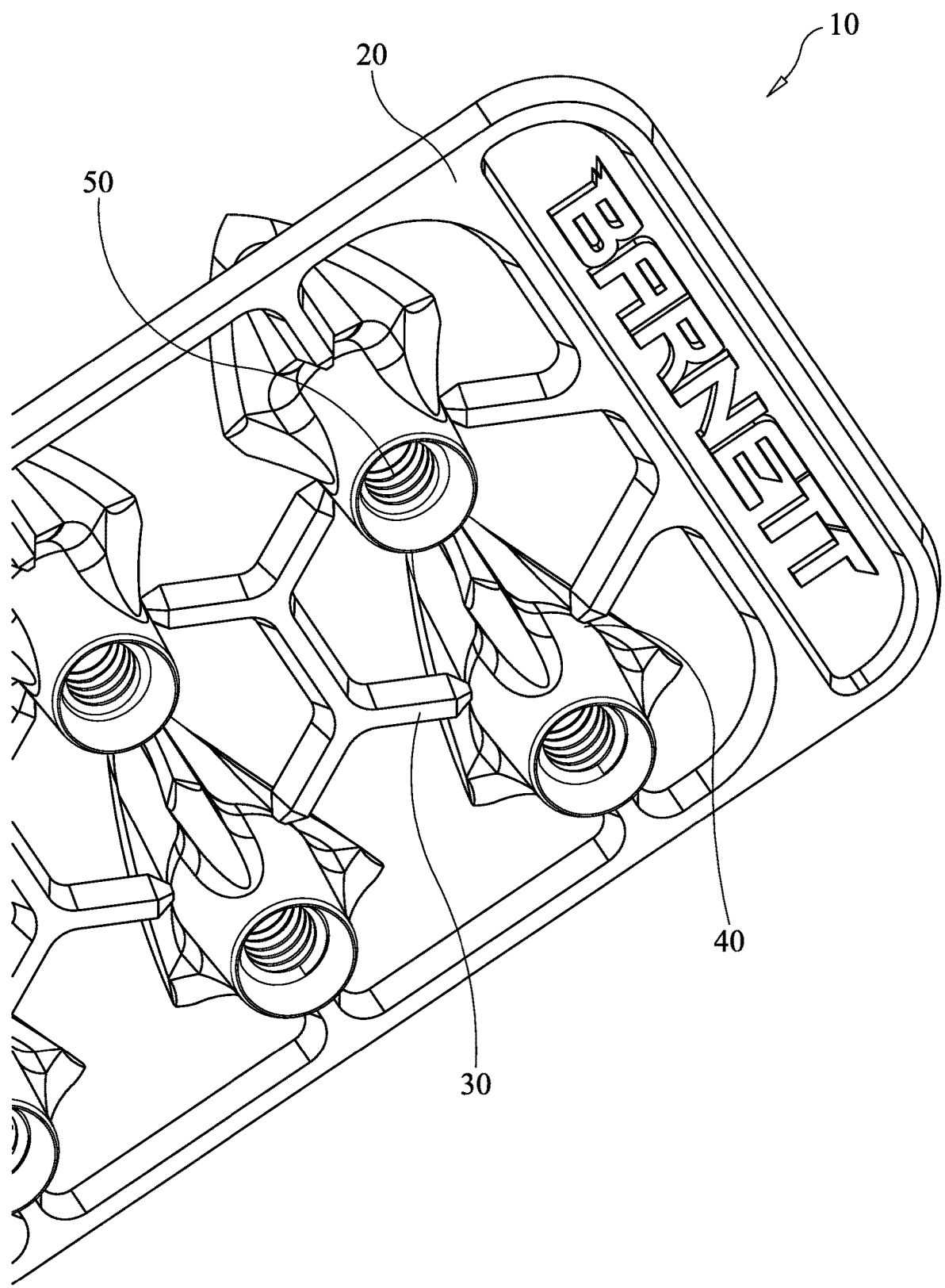
FIG. 1 is a partial top perspective view of an arrow head cluster in accordance with the present invention.
Figure 2:
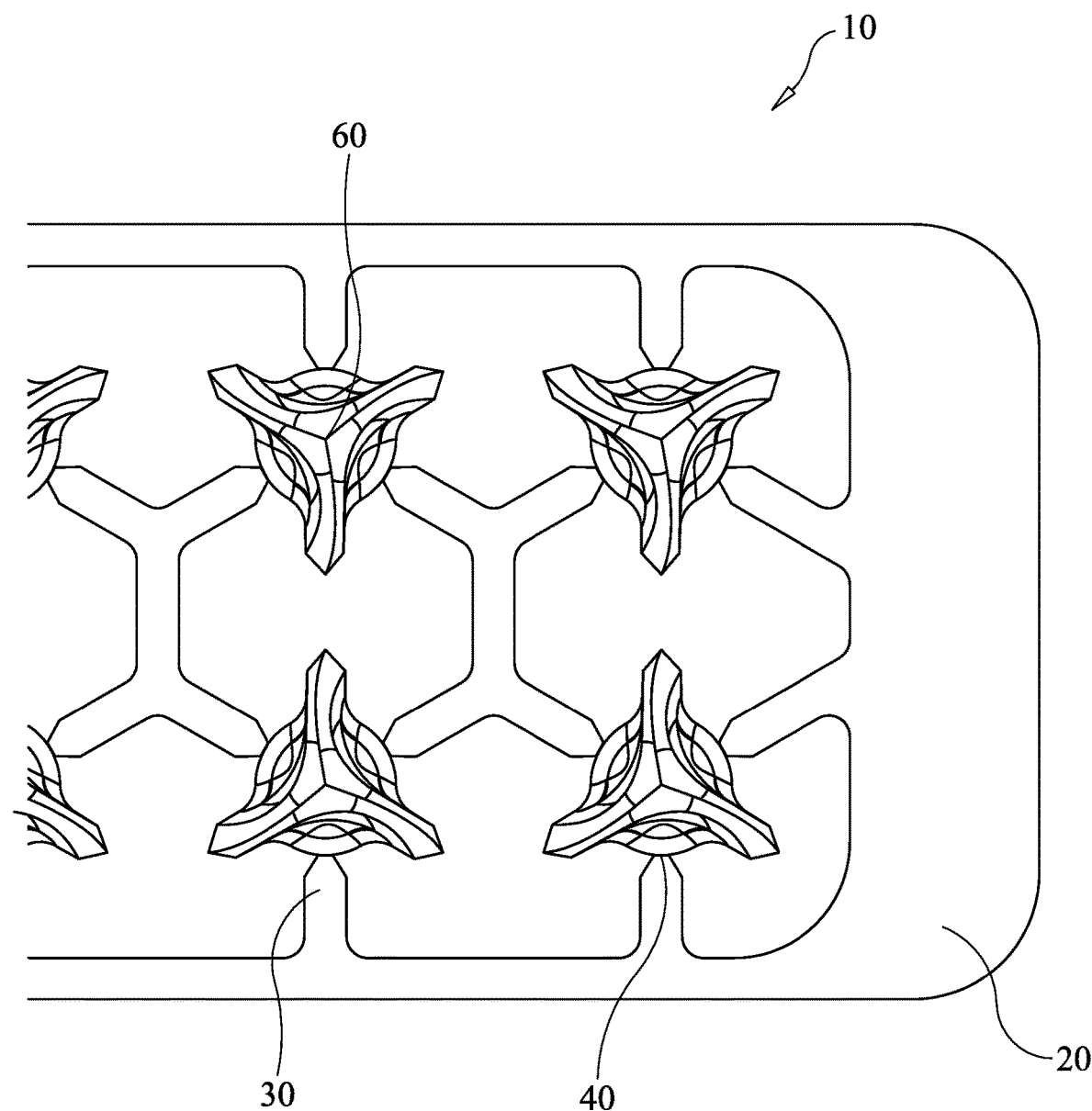
FIG. 2 is a partial bottom perspective view of an arrow head cluster in accordance with the present invention.
Figure 3:
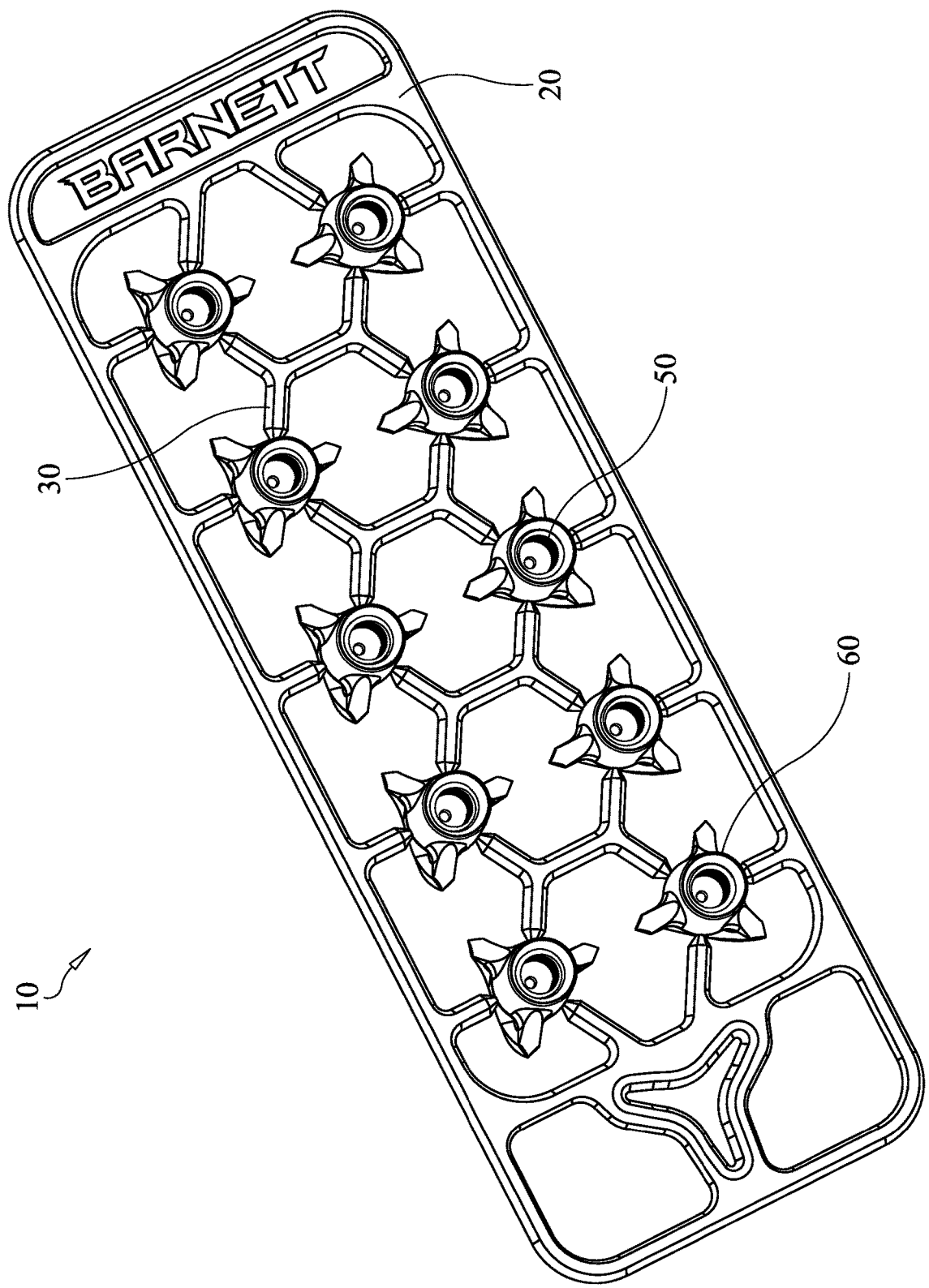
FIG. 3 is a top perspective view of an arrow head cluster in accordance with the present invention.
Figure 4:
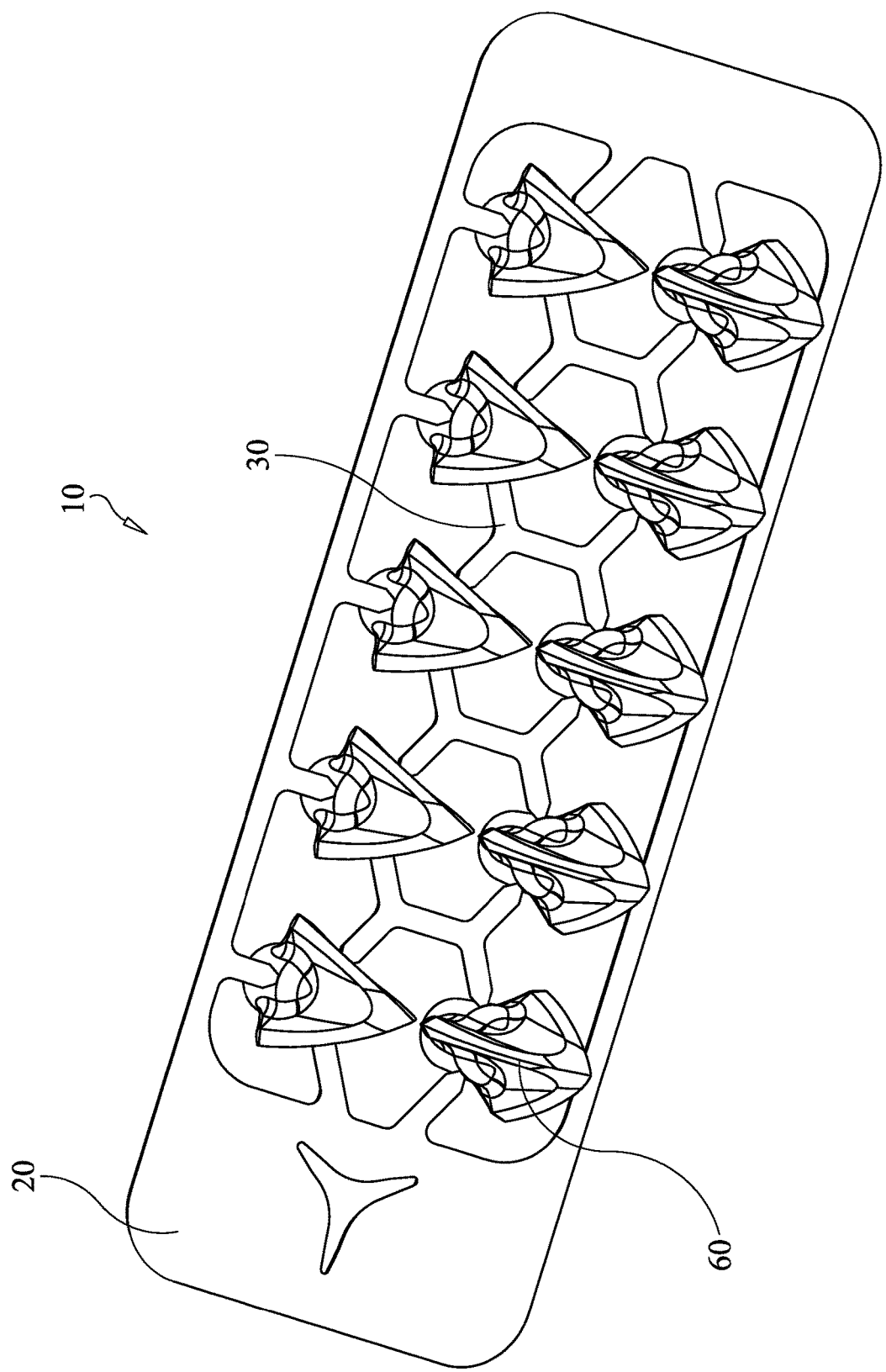
FIG. 4 is a bottom perspective view of an arrow head cluster in accordance with the present invention.
Figure 5:
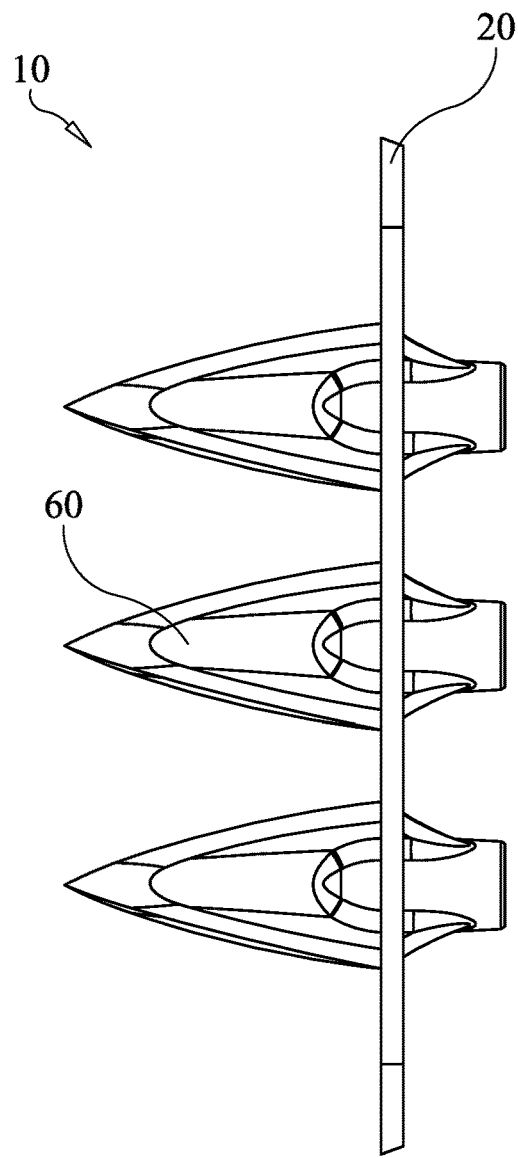
FIG. 5 is a side view of an arrow head cluster in accordance with the present invention.
Figure 6:
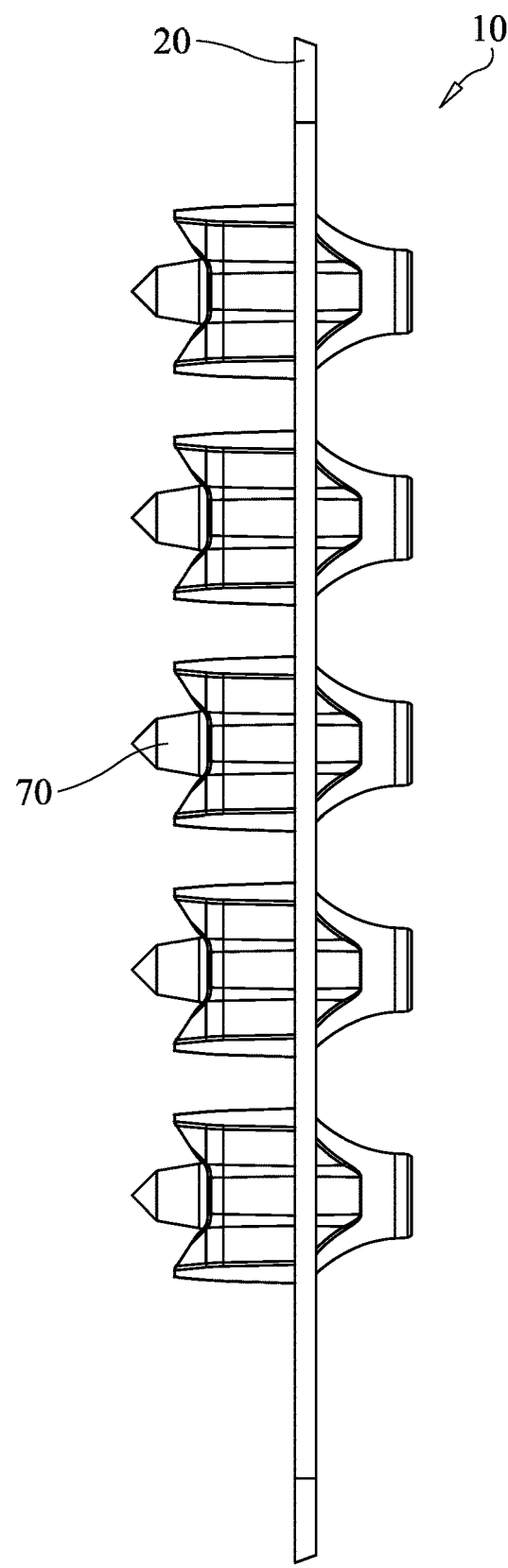
FIG. 6 is a side view of an arrow head cluster including small game style arrow heads in accordance with the present invention.
Figure 7:
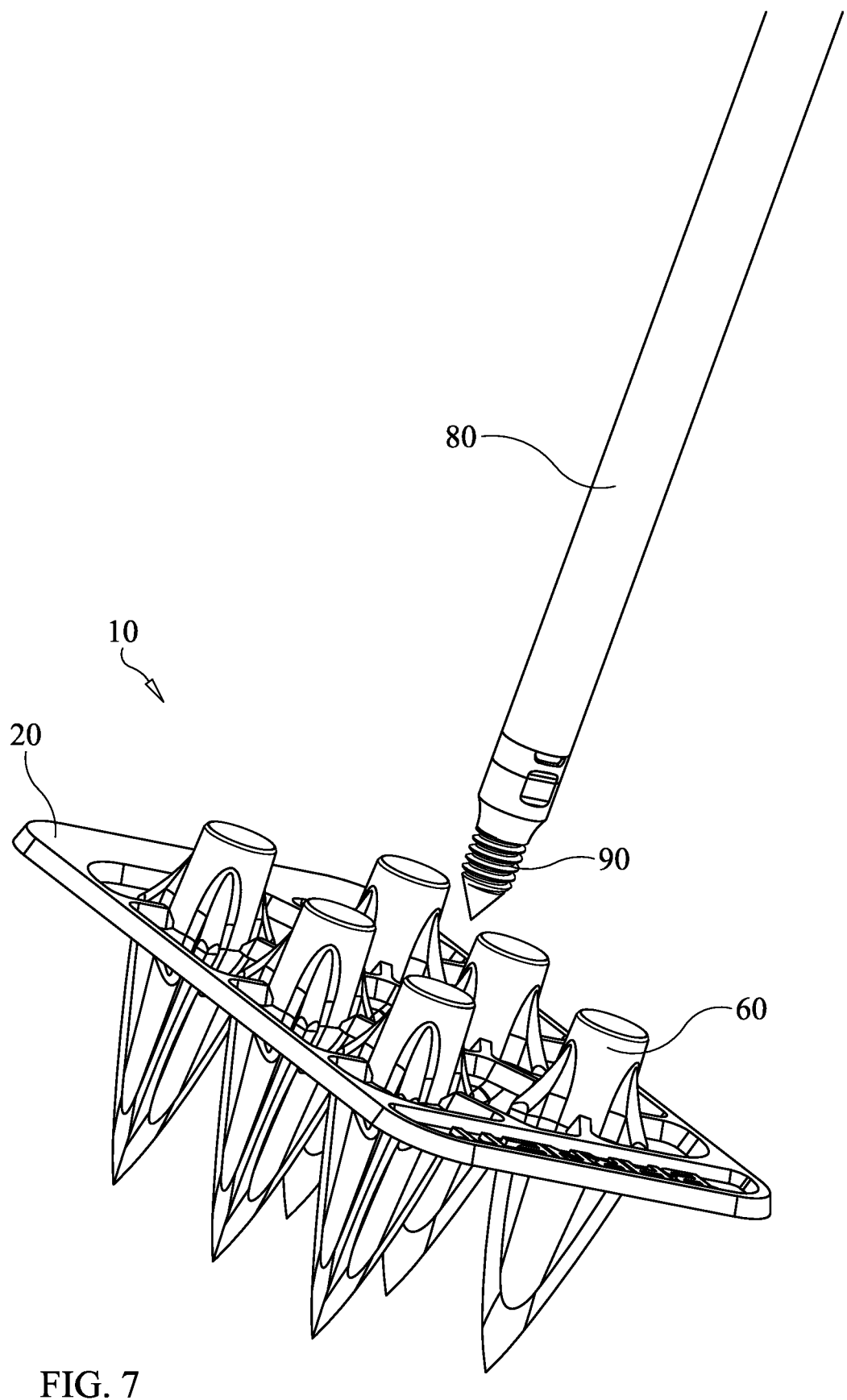
FIG. 7 is an exploded perspective view of an end of an arrow positioned adjacent an arrow head cluster in accordance with the present invention.
Figure 8:
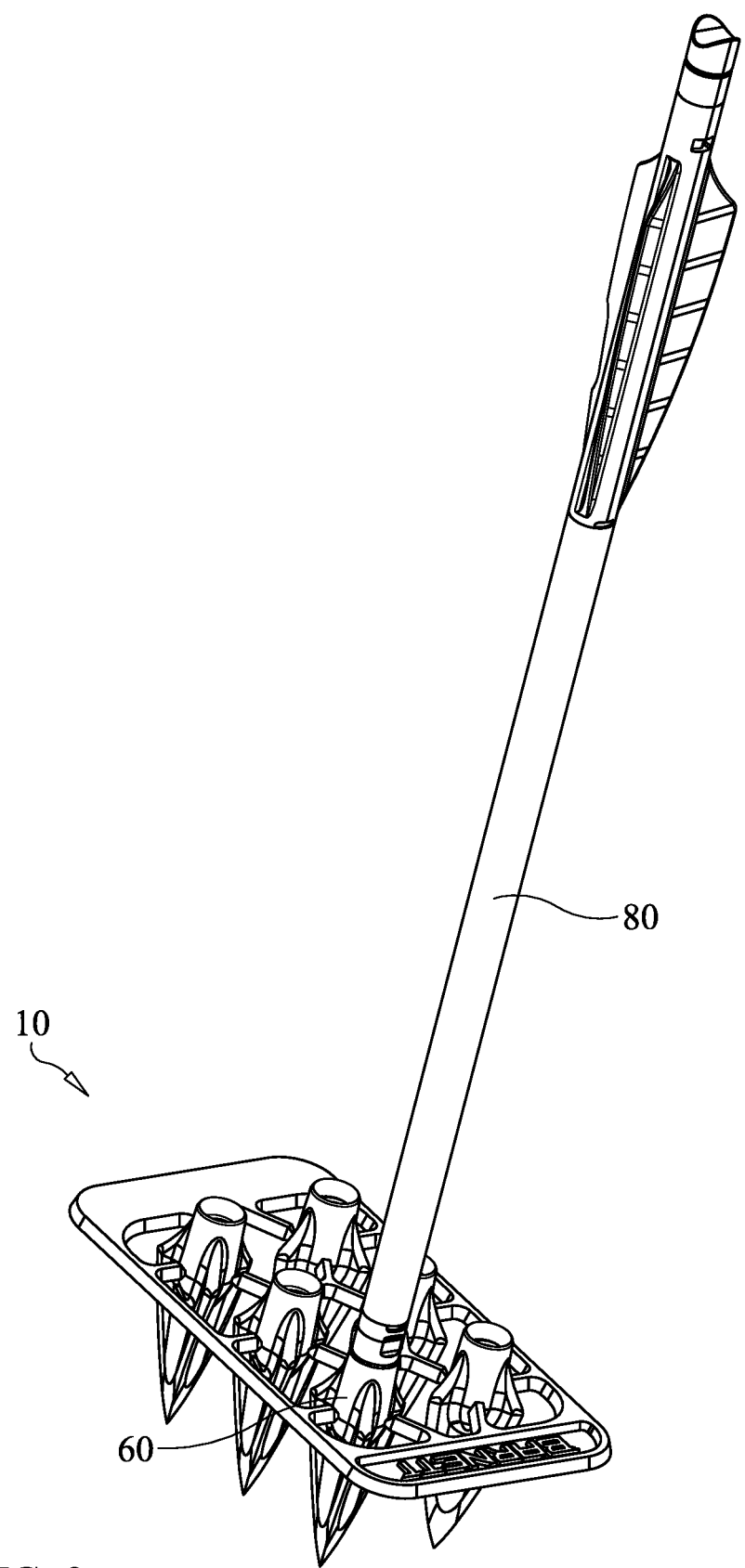
FIG. 8 is a perspective view of an arrow threaded into an arrow head of an arrow head cluster in accordance with the present invention.
Figure 9:
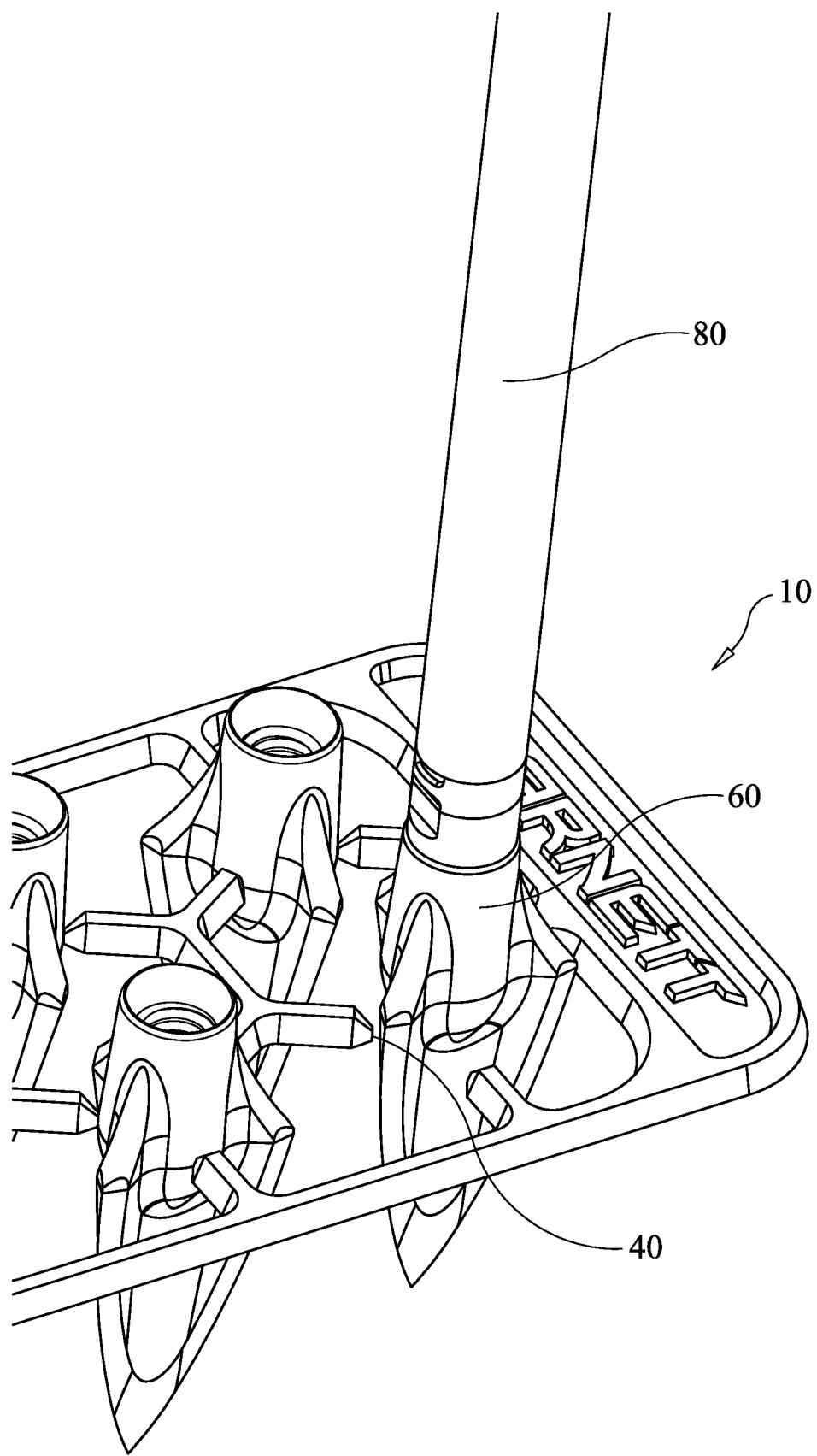
FIG. 9 is an enlarged partial perspective view of an arrow threaded into an arrow head of an arrow head cluster in accordance with the present invention.

With reference to FIGS. 1-9, an arrow head cluster 10 is created utilizing an injection mold (not shown). An upper cluster cavity is formed in the upper die member and a lower cluster cavity is created in the lower die member. The upper and lower cluster cavities are joined to create a cluster cavity. The cluster cavity is used to create the arrow head cluster 10, after molten material is injected therein. The cluster cavity includes a plurality of chambers for creating a plurality of arrow heads 60. The plurality of chambers are connected to each other with a plurality of flow channels 30 and a support frame 20. The injected material preferably includes metals, ceramic and plastic. High strength composite materials are injected into the cluster cavity through the plurality of flow channels. The plurality of flow channels 30 allow the material to flow evenly through the plurality of arrow head cavities. The plurality of flow channels are engineered to provide the correct flow of material and being large enough to support the individual arrow heads within the arrow head cluster, until final use. After the molding operation, the arrow head cluster 10 is removed from the injection mold and allowed to cool. After cooling, the arrow head cluster 10 is ready for packaging, after the steps of counting, assembling, and sharpening.

Each arrow head 60 is retained on the cluster frame 20 with at least one break away connection 40. At the time of first use, the user removes the cluster frame 20 from the packaging. An arrow 80 is threadably joined with one of the arrow heads 60. The arrow 80 is rotated in a first direction to the point where threads 90 of the arrow 80 and threads 50 of the arrow head 60 are completely engaged. Once the threads 50, 90 are completely engaged, the user rotates the arrow 80 in the same direction just enough to break the arrow head 60 away from the cluster frame 20.

The arrow head 60 may be a broadhead having internal threads or external threads. The arrow head 70 may be a small game head having internal threads or external threads. The arrow head 60 may be a field point having internal threads or external threads. The arrow head 60 may be a judo point having internal threads or external threads. The arrow head clusters may include 2, 3, 4, 5, 6, 7, 8, 9, 10, 11, 12 or more arrow heads 60. In another embodiment, the arrow head cluster 10 may be molded with a protective, disposable hood (not shown). The disposable hood is attachable to a bow or crossbow. The arrows 80 would be threadably joined with the arrow heads 60, while still retained in the arrow head cluster 10.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An arrow head cluster comprising:
   a cluster of a plurality of arrow heads joined with each other and a frame;
   each arrow head includes a threaded section to threadably engage an end of an arrow; and
   said frame retains said plurality of arrow heads with said frame as a single unit.
2. The arrow head cluster of claim 1 wherein:
   said plurality of arrow heads are retained on said frame with a break away connection.
3. The arrow head cluster of claim 1 wherein:
   said threaded section is external on the arrow head.
4. The arrow head cluster of claim 1 wherein:
   said threaded section is internal in said arrow head.
5. The arrow head cluster of claim 1 wherein:
   said cluster having at least two arrow heads.
6. The arrow head cluster of claim 1 wherein:
   the threads of the arrow head are external and self-tapping.
7. An arrow head comprising:
   an arrow head which includes a frontal section and an arrow head rear section, external self-tapping threads are formed on the arrow head rear section; and
   said arrow head is created in a cluster of a plurality of arrow heads joined with each other and a frame.

\* \* \* \* \*